March 27, 1962

W. R. HOWARD 3,026,679

HYDRODYNAMIC COUPLING

Filed May 1, 1959

INVENTOR.
WAYNE R. HOWARD
BY
Kenneth C. Witt
ATTORNEY

March 27, 1962

W. R. HOWARD 3,026,679

HYDRODYNAMIC COUPLING

Filed May 1, 1959

INVENTOR.
WAYNE R. HOWARD
BY
Kenneth C. Witt
ATTORNEY

March 27, 1962 W. R. HOWARD 3,026,679
HYDRODYNAMIC COUPLING
Filed May 1, 1959 5 Sheets-Sheet 3

INVENTOR.
WAYNE R. HOWARD
BY
Kenneth C. Witt
ATTORNEY

March 27, 1962  W. R. HOWARD  3,026,679
HYDRODYNAMIC COUPLING
Filed May 1, 1959  5 Sheets-Sheet 4

INVENTOR.
WAYNE R. HOWARD
BY
Kenneth C. Witt
ATTORNEY

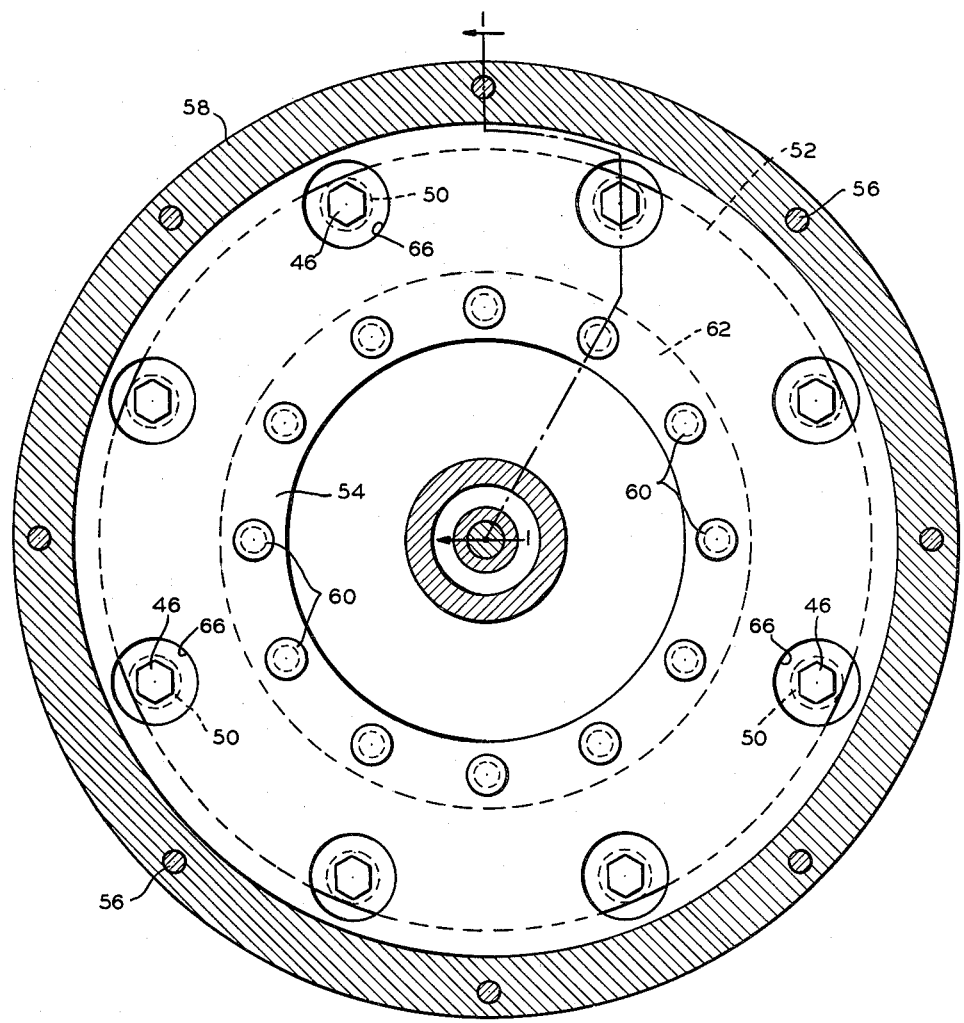

United States Patent Office

3,026,679
Patented Mar. 27, 1962

3,026,679
HYDRODYNAMIC COUPLING
Wayne R. Howard, Jackson, Mich., assignor to Clark
Equipment Company, a corporation of Michigan
Filed May 1, 1959, Ser. No. 810,299
3 Claims. (Cl. 60—54)

This invention relates to hydrodynamic coupling devices such as fluid torque converters and fluid couplings, and more particularly to improvements in means for circulating liquid and air within and around such devices.

It is common practice in the fluid coupling and torque converter art, particularly with regard to heavy duty torque converters for industrial use to deliver to and withdraw liquid from the coupling or converter by means of either a remote or self-contained positive displacement pump, with the liquid being circulated through externally located cooler means for dissipating heat from such liquid prior to recirculation thereof through the coupling or converter.

The present invention contemplates a new combination of elements and cooperation thereof and new structure for certain elements whereby a torque converter or other similar hydrodynamic coupling device may be constructed without the provision of any positive displacement pumping mechanism and without any external cooling means.

It is, therefore a primary object of the present invention to provide a construction for a hydrodynamic coupling device having an improved means to facilitate circulation and recirculation of liquid therethrough without the necessity for an expensive separate pumping mechanism.

It is a further object of the present invention to provide an improved and efficient arrangement for cooling the circulating liquid without the necessity for complicated externally located cooling means.

It is a still further object of the present invention to provide in a torque converter an improved structure of a bladed impeller element thereof comprising a helical groove arrangement cooperating with radial grooves to function in the manner of a pump cooperating with a gravity inlet arrangement.

It is a still further object of the present invention to provide an improved torque converter structure including an integral liquid supply sump having a structural arrangement providing a tortuous path for flow of circulating air thereabout whereby an efficient cooling of the liquid is accomplished without the necessity for an external liquid cooling mechanism.

It is a still further object of the present invention to provide an improved structural arrangement for a torque converter having air circulating vanes on the exterior surface of the impeller member thereof, and including an integral liquid containing sump so adapted and arranged that an efficient fan structure is provided and the cooling air is circulated in intimate contact with a substantial portion of the surface area of such sump.

The above and other objects and advantages of the present invention will become readily apparent to those skilled in the art from the following detailed description of an illustrative embodiment thereof shown in the accompanying drawing forming a part hereof and wherein.

Figure 1:
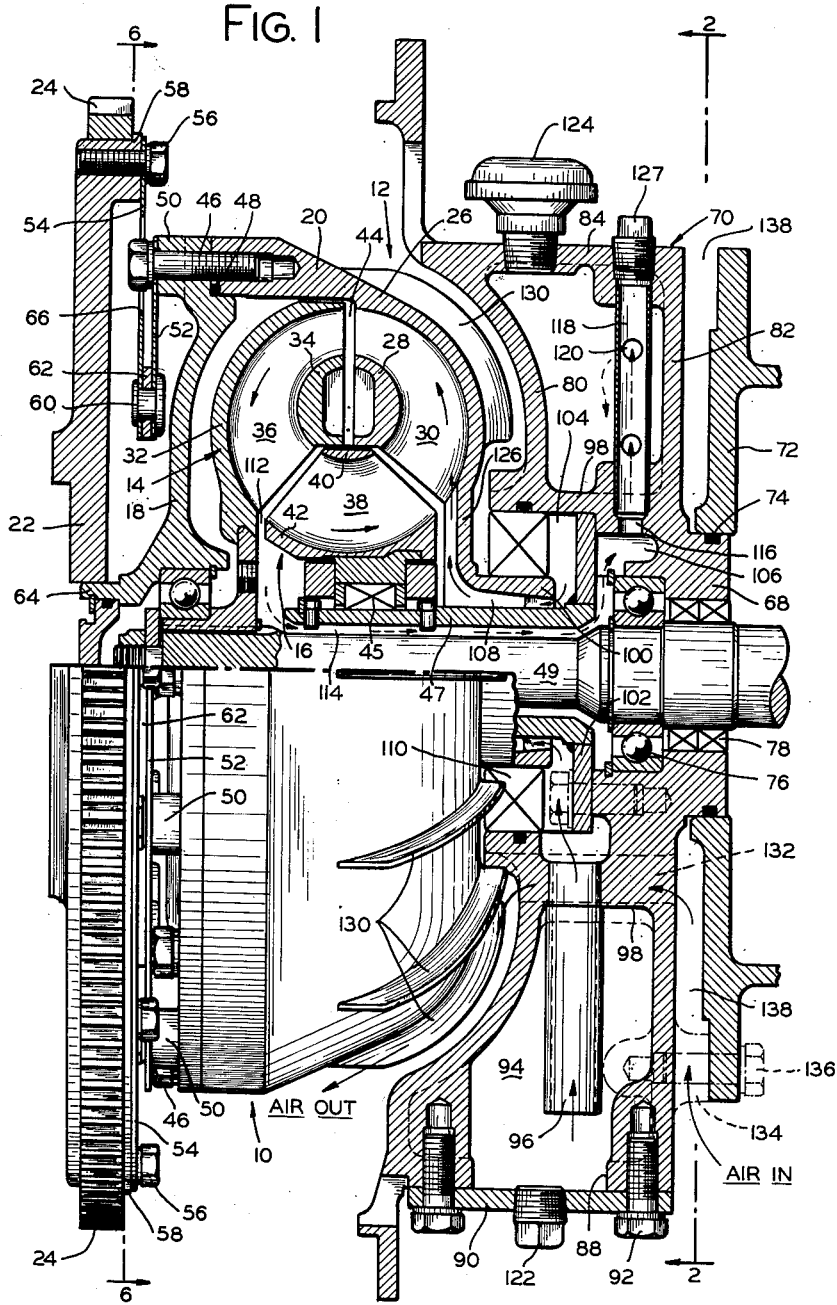
FIG. 1 is partial axial cross-sectional view of a torque converter embodying the structural features of the present invention.
Figure 3:
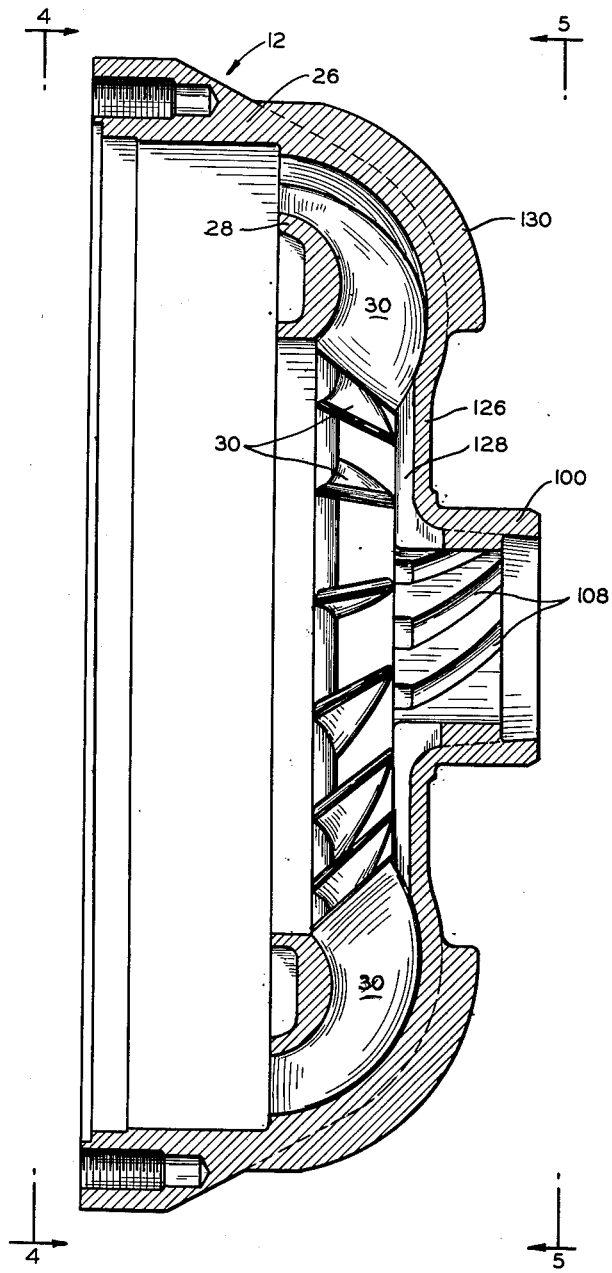
Figure 4:
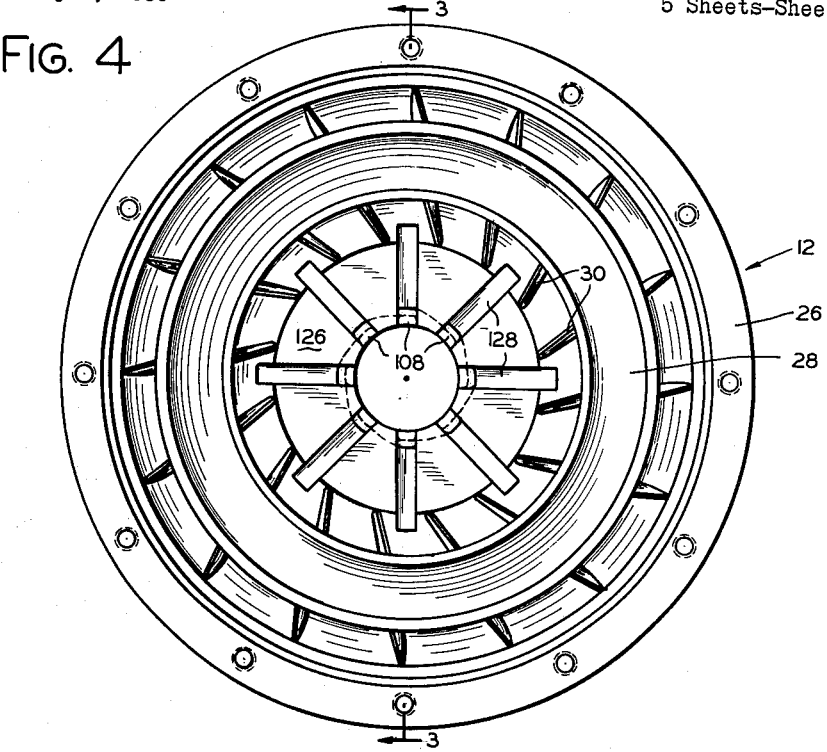
Figure 5:
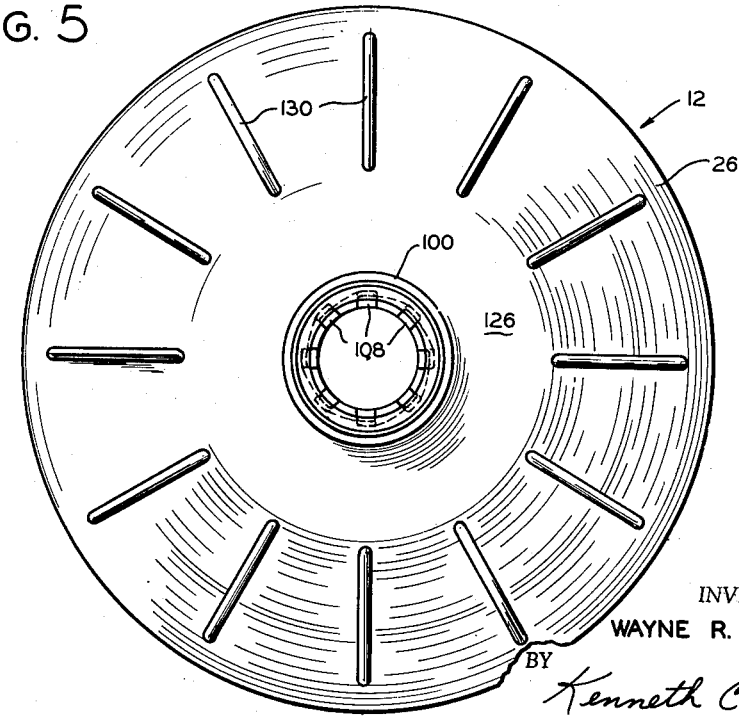

FIG. 3 is a cross-sectional view through the improved vaned impeller member for the torque converter of the present invention; the view being substantially as seen along the line 3—3 of FIG. 4, FIG. 4 is an elevational view of the interior surface of the improved impeller member of the torque converter of the present invention; the view being as seen when looking in the direction of the arrows 4—4 of FIG. 3, FIG. 5 is an elevational view of the exterior surface of the impeller member of the present invention; the view being as seen when looking in the direction of the arrows 5—5 of FIG. 3, and FIG. 6 is an elevational view in section looking in the direction of the arrows 6—6 in FIG. 1.

Referring now to the drawings, there is shown in FIG. 1 a rotary, three wheel, fluid torque converter generally designated by the reference numeral 10.

The torque converter 10 is of known type in its general or overall aspects, and includes an impeller wheel 12, a turbine wheel 14 and a reaction member or stator 16. The impeller wheel 12 includes an annular generally dish shaped portion 20. A member 18 is connected in axial alignment with portion 20. The member 18 is in the form of a disk having a peripheral portion which follows the outer contour of the turbine 14, and is suitably secured to drive means for rotation therewith. An annular plate or flywheel 22 is connected to the member 18 and to the drive means and carries an annular toothed band 24 at its outer periphery to provide for cooperation with the gears of an electric starter motor in the event the device is used with an internal combustion engine, as is well known in the art. The impeller 12 as illustrated, comprises a shell 26 of semi-toroidal shape, forming a part of portion 20, an inner ring portion 28, and blades 30 extending between and connected to the shell and core ring. The turbine 14 also comprises a semi-toroidal shell 32 and core ring 34 having blades 36 extending between and secured to the shell and core ring. The stator 16 comprises blades 38 extending between a core ring 40 and an inner ring portion 42.

It will be understood by those skilled in the art that the shell and ring portions of each bladed element above described are both annular and complete rings, although only portions of such shells and rings are illustrated in the drawing of FIG. 1. The three-bladed elements form and function as a hydrodynamic torque converter with the blades 30 of the impeller 12 functioning to impart energy to a body of liquid in the annular chamber 44 formed by the vaned wheels, the turbine 14 receiving energy from the fluid and stator 16 being held from rotation and functioning as a reaction element to change the direction of the flow of fluid so that the device functions to multiply torque until such time that the change in the direction of liquid leaving the turbine 14 and entering the stator 16 in the fluid circuit, indicated by the arrows in FIG. 1, causes the stator to be released by a one-way brake 45 between the stator and a stationary reactor sleeve 47 to provide a virtually direct drive between the drive means and a driven shaft 49 connected to the turbine 14.

The shell, blades, and core ring of each vaned element above described are usually of aluminum and may be formed as an integral unit by sand-casting, plaster mold casting, or other methods conventionally employed to provide for the facile and economical manufacture of these vaned elements.

To provide a driving connection between the flywheel 22 and the impeller 12, the member 18 is provided at the periphery thereof with a plurality of circumferentially spaced apertures for the reception of machine screws 46. The machine screws 46 pass through the member 18 and into the member 20 to rigidly secure them together for rotation as a unit. Suitable means such as a seal member 48 are provided to form a fluid-tight connection between the abutting flanged surfaces of the members 18 and 20.

A number of the machine screws are disposed to project axially outwardly from the member 18 from raised lugs or bosses 50 formed integrally with the member 18. For example, every other machine screw 46 may be so disposed circumferentially about the member 18. Securely fastened to the lugs or bosses 50 is an annular flexible plate 52 which extends radially inwardly from the periphery of the member 18. Another annular flexible plate 54 is secured by means of machine screws 56 to an axially extending flanges 58 at the periphery of the flywheel 22. The flexible plates 52 and 54 are secured together in spaced relationship adjacent the radially inner portions thereof by means of rivets 60 and suitable annular spacers 62. The member 18 is mounted for axial sliding movement relative to the flywheel 22 by means of an axially projecting hub 64 near the axis thereof, and the above described structure thereby provides an axially flexible connection between the flywheel and the impeller to compensate for expansion due to heat and internal pressure generated within the torque converter. Such connection provides desired flexibility without sacrificing torsional strength in the driving connection. If desired, the annular flexible plates 52 and 54 may be formed of a plurality of layers of suitable material to provide a laminated structure of increased flexibility without sacrificing strength. It will be noted (see FIG. 6) that the flexible plate 54 is provided with a plurality of circumferentially spaced apertures 66 which are aligned with the machine screws 46 so as to freely pass the heads thereof and thereby provide for a more compact structure. By providing the two flexible plates instead of a single flexible plate, a substantial amount of relative axial movement may be provided for with each plate deflecting only half the amount of the overall relative axial movement between the flywheel and the impeller housing. If a single flexible plate were used, all of the axial movement would be taken up as deflection in such plate.

The driven shaft 49 of the torque converter 12 extends axially through a hub 68 formed centrally of a housing generally indicated by the reference numeral 70 and is connected to a mechanism to be driven by the torque converter which may, for example, be a transmission contained within a suitable housing having an end wall 72 suitably mounted upon the hub 68 and sealed in a fluid-tight manner relative thereto by means of a seal member 74. The shaft 49 is suitably journaled for rotation within the hub 68 by means of a bearing 76 and suitable packing material or seals such as indicated at 78 are provided to prevent leakage of fluid along the shaft into or out of the housing 72.

Figure 2:
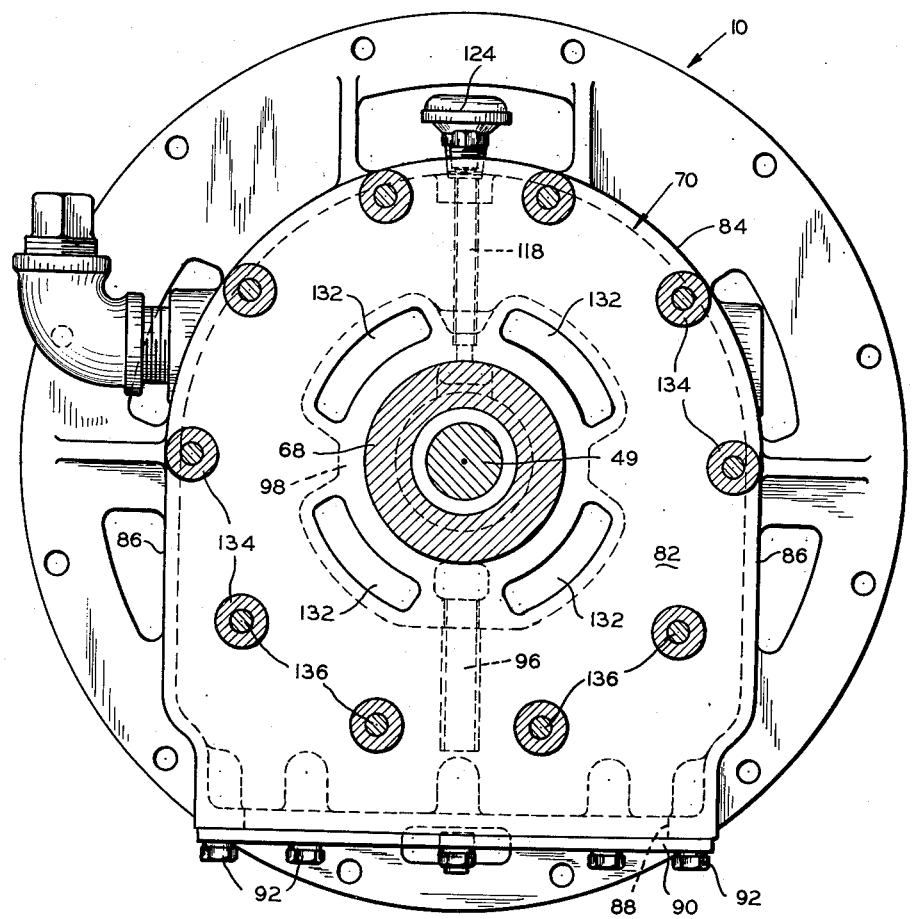
FIG. 2 is a cross-sectional view of the torque converter substantially as viewed along the line 2—2 of FIG. 1 and shows certain details of the structure which provide for circulation of cooling air in intimate contact with a substantial portion of the surface of the liquid containing sump.

The housing 70 includes a pair of spaced end walls 80 and 82 and a connecting wall having its upper portion 84 formed generally as a semi-circle with generally straight parallel side wall portions 86 (see FIG. 2) extending downwardly from approximately the axis of the shaft 49. The side walls 86 and end walls 80 and 82 are provided at the lower ends thereof with flanges forming an access opening 88 into the housing 70 which is normally closed by an access cover 90 held in place by suitable machine screws 92.

The housing 70 by virtue of the above described construction forms a reservoir 94 for containing a quantity of liquid such as oil for circulation and recirculation through the torque converter 10. As is well-known in the torque converter art, the bladed members, i.e., impeller 12, turbine 14 and stator 16, when in operation, set up a toroidal circulation of fluid within the space enclosed by the members 18 and 20. Fluid is admitted to such space from the reservoir 94. The reservoir 94 is provided with a conduit 96 having an inlet end spaced from the bottom for the admission of oil. The conduit 96 is securely fastened to, by any convenient means, and forms a duct extending through, an annular wall 98 which interconnects the two end walls 80 and 82. Located within and forwardly of the annular wall 98 are the shaft 49, the reactor sleeve 47, and an axially projecting annular hub 100 formed integrally with the shell 26 of the impeller 12. The reactor sleeve 47 is non-rotatably secured to the housing by means of an annular disc 102 which divides the space inside annular wall 98 into a pair of annular spaces 104 and 106. The conduit 96 communicates at its outlet end with the annular space 104 and space 104 in turn communicates with passage means 108 defined between the reactor sleeve 47 and the hub 100 to thus form an inlet for fluid to the torque converter 10 as indicated by the flow-path defined by the solid arrows in FIG. 1. Suitable means such as a seal 110 is provided to prevent leakage of fluid outwardly from the space 104 between the hub 100 and the annular wall 98.

The liquid entering the torque converter 10 flows axially through the helical (see FIG. 3) passages 108 and thence radially outwardly through radial channels 128 (see FIGS. 3 and 4) formed in the surface of flat portion 126 of impeller 12. At the same time, liquid leaves the toroidal space through the space 112 between the portions 32 and 42 of the turbine 14 and stator 16, respectively, in a path as shown by the dashed line arrows in FIG. 1. The discharged fluid flows axially into the open end of the reactor sleeve 47 and thence through an annular passage 114 defined between the reactor sleeve 47 and the driven shaft 49. From the annular passage 114 the liquid flows into the space 106 and thence upwardly through an aperture 116 in the annular wall 98 and into a conduit 118 which projects upwardly and is rigidly secured to the walls 98 and 84 of the housing 70. The conduit 118 is provided with one or more outlet openings 120 as desired to discharge the fluid into the reservoir 94 exteriorly of the annular wall 98 where it will flow by gravity toward the bottom of the reservoir 94 for recirculation through the converter. The access cover 90 is provided with a suitable drain plug 122 for draining the liquid from the reservoir periodically, as desired, and a suitable filler plug 124 is provided in the top wall 84 of the housing for replenishing the liquid supply as desired. The access cover 90 may be periodically removed, as necessary, to remove any accumulation of foreign particles such as grit and metallic particles from the reservoir 94 and to effect a thorough cleaning thereof.

While it is possible to circulate some liquid through a torque converter without a separate pump, such as by using gravity flow to get the liquid into the converter and the centrifugal and other forces generated in the converter to cause liquid to leave the converter, it is oftentimes necessary or desirable to increase the rate of flow of fluid through a torque converter for various reasons, usually to provide more cooling. In order to accomplish an increased rate of flow heretofore, it has been necessary to provide a separate pump, usually a positive displacement pump, such as a gear pump. These pumps have either been built into the housing or located remotely. The built-in pump structures, of course, add to the cost and take up space within the structure. Remotely located pumps are also costly and require the provision of additional tubing or conduits together with expensive and troublesome connecting elements to assure adequate sealing at points of entry and exit of fluid through the housings.

As previously mentioned, the present invention contemplates the provision of a new and novel arrangement for increasing the flow rate through the torque converter 10 without requiring the provision of a separate pumping mechanism. Referring now to FIGS. 3, 4 and 5, the improved mechanism for accomplishing this function will now be described. With particular reference to FIG. 3, it will be noted that the pasasge means defined between the reactor sleeve 47 and the hub 100 of the impeller 12 comprises a plurality of helically arranged grooves or passageways 108 extending substantially from one end of the hub 100 to the opposite end thereof where the hub merges with the radially extending wall 126 of the impeller 12. The wall 126 is provided with a plurality of radially extending grooves or passageways 128 which are connected respectively to and in effect form continuations of the passageways 108. The thread-like action of the helically arranged slots 108 which are so inclined relative to the direction of rotation of the impeller 12 as to function as a screw pump, together with the centrifugal action on the fluid in the radial slots 124, in effect creates a pump to assist and increase the rate of flow of fluid through the torque converter 10 to a substantial degree.

It should be noted that the reservoir 94 normally has a fluid level which is above the top of the shaft 49 so that the fluid to the passageways 108 is supplied by gravity and, therefore, there is not a requirement for elevating the fluid from a great distance below the grooves 108.

There may be considerable heat generated in a hydrodynamic coupling device, particularly if it is of the torque converter type described and illustrated herein and such torque converter is operated for a substantial portion of time in the torque converting range. The present invention provides improved means for dissipating such heat. The dissipating means include the oil circulating portion of the device which has already been described and the air circulating portion described hereinafter.

The present structure includes a plurality of circumferentially spaced radially extending vanes 130 formed integrally with the shell 26 of the impeller 12. The front wall 80 of the housing 70 is suitably formed so as to follow the curved contour of the shell member 26 and thus forms a shroud which covers the vanes 130 in such a manner as to leave exposed the ends of the vanes. The vanes function to circulate air and also serve to radiate heat from the toroidal chamber. The housing 70 is further provided with a plurality of annularly arranged passages 132 which are formed in spaced relationship in the hub portion 68 thereof and serve as axial passages for the circulating air. It will be noted that the rear end wall 82 of the housing 70 is provided with a plurality of circumferentially spaced bosses or lugs 134 which project outwardly therefrom and serve as means for mounting the end wall 72 of the transmission housing in spaced relationship thereto by means of a plurality of machine screws 136.

In operation, the air is drawn into the space 138 defined between the housing walls 72 and 82 substantially at the marginal edges thereof and is caused to flow radially inwardly and thence axially through passages 132 toward the radially inner ends of the vanes 130. The air is then expelled at the radially outer ends of the vanes 130 in the direction of the arrows shown in FIG. 1. It will be noted that the shroud formed by the housing wall 80 directs the air over the curved or sloping surface of the shell 26 and causes it to be expelled in a forward direction tangentially of the surface, thereby increasing the efficiency of the fan and permitting more heat to be extracted per unit volume of air handled.

An important feature of the present structure resides in the fact that the circulating air is drawn in and expelled through a tortuous path thus causing it to come into contact with a major portion of the surface area of the housing 70 forming the fluid reservoir whereby a substantial amount of heat is extracted from the fluid within the housing by the air prior to its entry into the chamber containing vanes 130 where it then absorbs additional heat from the fluid contained within the torque converter chamber. The passages 132 are, of course, designed to be of such size as to insure an adequate supply of cooling air to be circulated in accordance with the particular design of the torque converter 10 and the purpose for which it is to be used.

In the structure described and illustrated herein, there is provided a closed and self-contained liquid circulating system which does not include an externally located cooler for dissipating heat from the circulating fluid. It has been found that the combination of the self-contained liquid and air circulating systems of the present device are adequate for many applications. However, it is contemplated that if it is desired to utilize an external cooler conduit 118 may be removed and replaced by a similar conduit which does not have the outlet openings 120 communicating with the interior of reservoir 94. Then by removing plug 127, it is possible to connect a separate external cooler through which the liquid is circulated and then returned to the reservoir 94.

From the foregoing description, it should now be apparent to those skilled in the art that the structure and arrangement of the present invention provides a new and novel combination for accomplishing the objects and advantages stated at the outset.

Summarising, there is provided a novel structure and arrangement for increasing the rate of flow of liquid through a hydrodynamic coupling device without the necessity for a separate pump. In addition to the increase in rate of flow of fluid through the device, there is also provided a new and novel and efficient cooling structure including the liquid circulating arrangement together with the air circulating arrangement providing for passage of the circulating air in contact with a major proportion of the reservoir housing to thereby effect an efficient dissipation of heat.

While the invention has been described herein by way of reference to one specific illustrative embodiment thereof, it will be obvious to those skilled in the art that it is capable of many alterations, changes in mechanical equivalents and alternative embodiments without departing from the true spirit thereof. It is, therefore, not intended that the invention should be restricted or limited to the particular embodiment shown and described; nor otherwise than by the terms of the appended claims.

Where reference is made in the claims to "helical" or "helically arranged" grooves, it should be understood that it is not intended to limit the claims to a pure helix in the geometrical sense; rather it is intended to cover all spiral and other configurations which perform an equivalent screw type action.

What is claimed as new and desired to be secured by Letters Patent of the United States is:

1. In a hydrodynamic coupling device having a plurality of rotatable bladed wheels, a fluid sump comprising a plurality of walls including two end walls, one of the said end walls being located closely adjacent and conforming to the contour of the outer surface of one of the bladed wheels, vanes on the said outer surface of said one of the bladed wheels which cooperate with said one end wall for circulating air, means cooperating with the other end wall for directing air over the outer surface of such wall, and a plurality of longitudinally disposed passages connected between the said two end walls centrally of the sump, whereby the circulating action of the said vanes produces a flow of air over one of the end walls, through the said passages and then simultaneously over the other end wall and said one bladed wheel.

2. A rotary fluid torque converter apparatus comprising three coaxially located bladed wheels, namely, an impeller, a turbine and a reaction member, the said three bladed wheels being arranged to form a toroidal working chamber adapted for containing fluid, a multi-walled housing defining a stationary fluid containing reservoir located adjacent the said impeller, a driven shaft secured to the said turbine and projecting through the said housing, a tubular sleeve for supporting the said reaction member non-rotatably secured to the said housing in coaxial spaced relationship to said driven shaft to form therebetween a first fluid passage, an axially extending hub portion on the said impeller surrounding the said tubular sleeve and having an internal cylindrical surface having a running fit with the said sleeve, a plurality of helically arranged grooves in the said cylindrical surface forming a second fluid passage, the said impeller having an internal radially disposed flat surface confronting a side surface of the said reaction member, the said flat surface having a plurality of radially disposed grooves therein equal in number to the said helically arranged grooves and interconnected respectively with such helical grooves whereby to provide communication to said toroidal working chamber for the admission of fluid thereto, means carried by the said tubular sleeve and cooperating with the said housing to define a pair of fluid chambers communicating respectively with said first and second fluid passages and the said reservoir, whereby fluid is circulated in a closed path from the said reservoir through one said fluid chamber and said second fluid passage and the said radially disposed grooves into the said working chamber and thence via the said first fluid passage and the other said fluid chamber back to the reservoir, a plurality of air circulating vanes on the outer surface of the said impeller facing the said housing, the said housing including a pair of axially spaced end walls, one of said end walls having a portion thereof located closely adjacent the said vanes and cooperating therewith to form a fan device, means cooperating with the other end wall for directing air over the outer surface of such wall, and a plurality of longitudinally disposed air passages connected between the said two end walls centrally of the housing and disposed around the said driven shaft, whereby the circulating action of the said vanes produces a flow of air over one of the said end walls and through the said air passages and then over the other end wall.

3. In a hydrodynamic coupling device having a plurality of rotatable bladed wheels, a fluid sump comprising a plurality of walls including two end walls, one of the said end walls being located closely adjacent and conforming to the contour of the outer surface of one of the bladed wheels, vanes on the said outer surface of said one of the bladed wheels which cooperate with said one end wall for circulating air, and a plurality of longitudinally disposed passages connected between the said two end walls centrally of the sump, whereby the circulating action of the vanes produces a flow of air axially inwardly through the said passages and then radially outwardly over the said one end wall and said one bladed wheel, the air flowing over the said one end wall and said one bladed wheel simultaneously.

References Cited in the file of this patent

UNITED STATES PATENTS

| | | |
|---|---|---|
| 1,905,368 | Coats | Apr. 25, 1933 |
| 1,190,697 | Kiep | May 23, 1933 |
| 2,100,191 | Lapsley | Nov. 23, 1937 |
| 2,363,983 | Miller | Nov. 28, 1944 |
| 2,416,193 | Meyers | Feb. 18, 1947 |
| 2,679,728 | Trail | June 1, 1954 |